United States Patent [19]
Hirane

[11] Patent Number: 5,578,202
[45] Date of Patent: Nov. 26, 1996

[54] WATER PROCESSING SYSTEM FOR HIGHLY CONTAMINATED WATER

[75] Inventor: Ken Hirane, Saitama-ken, Japan

[73] Assignee: Daiwa Kogyo Kabushiki Kaisha, Tokyo, Japan

[21] Appl. No.: 508,610

[22] Filed: Jul. 28, 1995

[30] Foreign Application Priority Data

Feb. 17, 1995 [JP] Japan .................... 7-053460

[51] Int. Cl.⁶ .................... C02F 3/06; C02F 3/30
[52] U.S. Cl. .................... 210/150; 210/151; 210/195.1; 210/196; 210/202; 210/209
[58] Field of Search .................... 210/150, 151, 210/195.1, 196, 198.1, 202, 209, 218, 903

[56] References Cited

U.S. PATENT DOCUMENTS

| | | | |
|---|---|---|---|
| 4,421,648 | 12/1983 | Besik | 210/151 |
| 4,431,543 | 2/1984 | Matsuo et al. | 210/903 |
| 4,479,876 | 10/1984 | Fuchs | 210/151 |
| 4,608,157 | 8/1986 | Graves | 210/202 |
| 5,182,021 | 1/1993 | Spector | 210/903 |
| 5,207,899 | 5/1993 | Boyle | 210/903 |
| 5,227,051 | 7/1993 | Oshima | 210/150 |
| 5,232,586 | 8/1993 | Malone | 210/150 |
| 5,308,479 | 5/1994 | Iwai et al. | 210/151 |
| 5,352,357 | 10/1994 | Perry | 210/150 |
| 5,462,666 | 10/1995 | Kimmel . | |

*Primary Examiner*—Stanley S. Silverman
*Assistant Examiner*—Theodore M. Green
*Attorney, Agent, or Firm*—Marshall & Melhorn

[57] ABSTRACT

In a water processing system for processing highly contaminated water, comprising an anaerobic chamber, an aerobic chamber, a buffering chamber, and a recycle for recycling part of the water received in the buffering chamber back to the anaerobic chamber, filter material forms a buoyant filter layer in an upper part of the water received in the anaerobic chamber without any constraint imposed on the filter material with the result that the filter layer can be highly resistant against clogging, and can be easily maintained with the result that the overall system can be made both simple and economical. Either an upflow arrangement or a downflow arrangement is possible for the anaerobic chamber. Furthermore, by using an integral structure combining various processing units into a single processing vessel, the overall size of the system can be minimized. Additionally, because nitrifying microbes and denitrifying microbes can be maintained at high concentrations in the processing chambers, a high purification performance can be attained while minimizing the size of the processing vessel. The buffering chamber may server as a reservoir for a recycle pump.

7 Claims, 2 Drawing Sheets

WATER PROCESSING SYSTEM FOR HIGHLY CONTAMINATED WATER

TECHNICAL FIELD

The present invention relates to a system for purifying highly contaminated water which contains a large amount of SS (suspended substances) and high concentrations of BOD, COD and $NH_4$-N (ammonium compounds) as is the case with the sewage from food processing plants and toilets.

BACKGROUND OF THE INVENTION

A conventional water processing system designed for processing highly contaminated water typically comprises an anaerobic processing unit which is suitable for processing highly contaminated water and an aerobic processing unit, such as the standard activated sludge process, which is capable of producing relatively pure water. In such a processing system combining an anaerobic processing unit and an aerobic processing unit, a part of the water processed by the aerobic processing unit is in some cases recycled to the anaerobic processing unit so that the nitrogen content nitrified in the aerobic processing unit is denitrified in the anaerobic processing unit, and the nitrogen content which is known to undesirably eutrophicate rivers and lakes can be effectively removed.

However, when the processing load is heavy, it is necessary to provide additional facilities for carrying out such preliminary processes as aggregation/precipitation and floatation separation processes. As a result, operation of the water processing system becomes unacceptably complex, and the overall system is made undesirable large in size. Furthermore, the space ratio of the contact material is required to be as high as 98% to prevent clogging of the processing vessel in both the anaerobic and aerobic processing units, and this prevents the attainment of a high level of purification, the typical final BOD and T-N (total nitrogen content) being no less than 20 mg/liter and 10 mg/liter, respectively.

Also, it is difficult to maintain nitrifying microbes, for instance, in a standard activated sludge processing tank for promoting the nitrification of the nitrogen content in the aerobic processing unit, and it is therefore necessary to carry out extensive aeration for satisfactory nitrification and denitrification to take place. As a result, a relatively long resident time becomes necessary. In the water processing systems which employ such carriers as plastic frames and honeycomb structures, the space ratio is so high that the ratio of nitrification typically ranges between 30 and 40%. The resident time has to be increased to achieve a higher ratio of nitrification which, however, would not be any more than 50%. Thus, according to the conventional technology, a high nitrification ratio cannot be achieved even when the resident time is increased, and the size of the system is increased.

BRIEF SUMMARY OF THE INVENTION

In view of such problems of the prior art, a primary object of the present invention is to provide a water processing system suitable for processing highly contaminated water which can be operated for an extended period of time without requiring any backwashing.

A second object of the present invention is to provide a water processing system which is capable of effectively removing nitrogen contents from the water without requiring a long resident time and/or increasing the size of the processing vessel.

A third object of the present invention is to provide a water processing system which can be implemented by using a compact processing vessel which is easy and economical to fabricate.

A fourth object of the present invention is to provide a water processing system which can convert highly contaminated water into highly purified water.

According to the present invention, these and other objects can be achieved by providing a water processing system for processing highly contaminated water, comprising: a processing vessel having a plurality of processing chambers defined by partition walls; the processing chambers comprising; an anaerobic chamber having an inlet port and a buoyant filter layer consisting of a plurality of blocks of buoyant filter material; an aerobic chamber having a first communication passage communicating a lower part thereof with the anaerobic chamber, a buoyant filter layer consisting of a plurality of blocks of buoyant filter material which are constrained in an intermediate part of the aerobic chamber by first screen means extending across the aerobic chamber, and aeration means, the communication passage being provided with second screen means for preventing the filter material in the anaerobic chamber from flowing into the aerobic chamber; buffering chamber having an outlet port and a second communication passage communicating an upper part of the aerobic chamber with the buffering chamber; and recycle means including a recycle passage communicating the buffering chamber with the anaerobic chamber, and pump means for supplying a part of water obtained from the aerobic chamber and stored in the buffering chamber to the anaerobic chamber.

According to this arrangement, because the filter material in the anaerobic chamber simply floats in the water to be processed without any constraint imposed on the filter material, the filter layer can be highly resistant against clogging, and can be easily maintained with the result that the overall system can be made both simple and economical. Furthermore, by using an integral structure combining various processing units into a single processing vessel, the overall size of the system can be minimized. Additionally, because nitrifying microbes and denitrifying microbes can be maintained at high concentrations in the processing chambers, a high purification performance can be attained while minimizing the size of the processing vessel. The buffering chamber may serves as a reservoir for the recycle pump.

According to a preferred embodiment of the present invention, the water to be processed flows downward in the anaerobic chamber, and the first communication passage consists of a plurality of small openings provided in a lower part of a partition wall separating the anaerobic chamber from the aerobic chamber. In this case, the anaerobic chamber and the aerobic chamber can be directly communicated by the first communication passage, for instance provided in the partition wall separating these two chambers so that the structure of the processing vessel can be substantially simplified. To prevent the clogging of the small openings, the lower part of the partition wall may be curved or made wavy so that a large number of small holes may be provided in this part, and the effective cross sectional area of the small holes may be maximized. Furthermore, because the contaminants are substantially removed from the water to be processed by the time it reaches the first communication passage either by biological decomposition or by sedimentation, the first communication passage is relatively free from clogging.

In another preferred embodiment of the present invention, the water to be processed flows upward in the anaerobic chamber. The second screen means may be provided in a passage communicating the anaerobic chamber with the flow direction reversing chamber to prevent the filter material in the anaerobic chamber from being lost from the anaerobic chamber. To employ an upward flow in the aerobic chamber, a flow direction reversing chamber may be interposed between the anaerobic chamber and the aerobic chamber for communicating an upper part of the anaerobic chamber with a lower part of the aerobic chamber.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
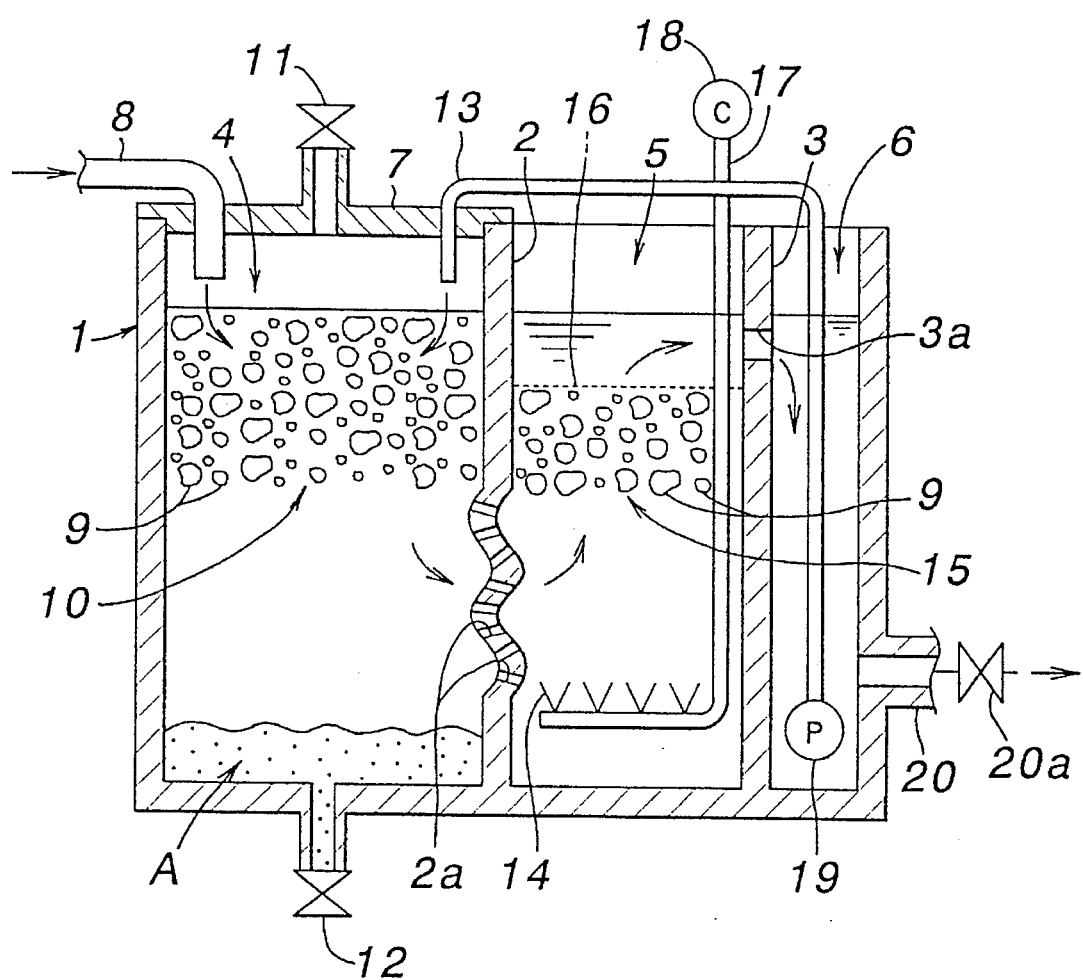
FIG. 1 is a diagram showing a first embodiment of the water processing system according to the present invention.

FIG. 1 shows a first embodiment of the processing system for highly contaminated water according to the present invention. This processing system is designed to process contaminated water rich in SS, in particular SS consisting of mostly organic substances, and the processing vessel 1 of this system consists of a somewhat laterally elongated box-shaped tank which is laterally separated into three chambers by first and second partition walls 2 and 3.

The surrounding wall and the bottom wall of this processing vessel, as well as the partition walls 2 and 3, are made of steel plate, and are integrally welded together. The three chambers consist of an anaerobic chamber 4, an aerobic chamber 5, and a buffering chamber 6 for temporarily storing the water that has been processed. The water to be processed flows into the anaerobic chamber 4, and then to the aerobic chamber 5, and the purified water is introduced into the buffering chamber 6. The volumes of these chambers are determined appropriately by taking into account the degree of contamination of the water, and the nature of the contaminants.

The water to be processed is, first of all, introduced into the anaerobic chamber 4, which is maintained in an anaerobic condition, via an inlet tube 8 passed through an upper lid 7 of the anaerobic chamber 4. This anaerobic chamber 4 is filled with a large number of irregularly shaped blocks of foamed plastic material 9 which is lighter than water, and a buoyant filter layer 10 is thus formed in an upper part of the water received in the anaerobic chamber 4. The buoyant filter layer 10 retains denitrifying microbes which remove nitrogen contents in the water by converting them into nitrogen gas, as well as common anaerobic microbes which decompose organic contents which exist in the water at high concentrations.

The water to be processed then flows downward through the buoyant filter layer 10, and the BOD content of the water is reduced by the anaerobic microbes which decompose the organic contents in the water. The resulting carbon dioxide, methane gas and other gaseous substances are released from a gas ejection port 11 provided in the upper lid 7. The sludge consisting of solid organic substances which were not decomposed in the buoyant filter layer 10 and solid inorganic substances precipitates in the bottom part of the anaerobic chamber 4 and forms a sediment layer A. The precipitated sludge is removed from the lower eject port 12 as required.

A recycle tube 13 is also passed through the upper lid 7 to introduce a part of the water aerobically processed in the aerobic chamber 5 back into the anaerobic chamber 4. The nitrogen component which has been nitrified in the aerobic chamber 5 is effectively denitrified by the denitrifying microbes retained in the buoyant filter layer 10 of the anaerobic chamber 4. Thus, the buoyant filter layer 10 of the anaerobic chamber 4 simultaneously effects both the reduction of BOD and denitrification in a highly efficient manner.

After flowing through the buoyant filter layer 10, the water to be processed flows into the aerobic chamber 5 via small holes 2a provided in a relatively lower part of the first partition wall 2 separating the anaerobic chamber 4 and the aerobic chamber 5 from each other. This part of the first partition wall 2 is provided with a wavy shape so that a large number of small holes may be formed therein, and the effective cross sectional area of the passage of the water flowing from the anaerobic chamber 4 to the aerobic chamber 5 may be maximized. The size of each small hole 2a is determined so that the filter material 9 filled in the anaerobic chamber 4 would not migrate into the aerobic chamber 5, and the anaerobic environment of the anaerobic chamber 4 may not be destroyed.

The water to be processed is introduced into the aerobic chamber 5 via the small holes 2a flows upward through a buoyant filter layer 15 provided in a middle part of the aerobic chamber 5 along with air bubbles which are released from aeration nozzles 14 provided near the bottom wall of the aerobic chamber 5 for maintaining the aerobic condition of the aerobic chamber 5. The buoyant filter layer 15 consists of a large number of irregularly shaped blocks of foamed plastic filter material 9 lighter than water which are constrained under a wire mesh screen 16 extending laterally across the aerobic chamber 5 at a relatively upper part thereof.

The filter material 9 retains nitrifying microbes which nitrify nitrogen contents in the water to be processed as well as aerobic microbes which assimilate organic substances contained in the water to be processed. The water to be processed, as it flows through the buoyant filter layer 15, contacts the aerobic microbes carried by the buoyant filter material 9 with the result that the organic contents therein are assimilated by the aerobic microbes, and the BOD content is reduced. At the same time, the nitrifying microbes likewise carried by the buoyant filter material 9 promote the nitrification of the nitrogen components in the water to be processed. Compressed air produced by an air compressor 18 is supplied to the aeration nozzles 14 via an air supply tube 17.

The water to be processed, which has flowed through the buoyant filter layer 15 and reached above the wire mesh screen 16, is introduced into the buffering chamber 6 via a communication hole 3a provided in the second partition wall 3 somewhat above the wire mesh screen 16. The water is stored in the buffering chamber 6 for some time before it is finally ejected from the water processing system via an outlet tube 20 connected to a side wall of the buffering chamber 6. By thus providing the buffering chamber 6, it is possible to control the amount of effluent from the system even when the amount of inflow into the system fluctuates to a certain extent.

A pump 19 is submerged in the buffering chamber 6 to recycle a part of the processed water back to the anaerobic chamber 4 via the recycle tube 13 as discussed earlier. In this case, the buffering chamber 6 is employed as a pump reservoir to facilitate the operation of the pump 19 although the present invention is by no means limited by this embodiment.

The buoyant filter layer 16 of the aerobic chamber 5 can be backwashed by releasing air from the aeration nozzles 14 or other air releasing arrangement provided under the buoyant filter layer 16. Because the water is allowed to flow into and out of the water communication hole 3a, the water in the aerobic chamber 5 can be favorably stirred during the backwashing process, and a favorable backwashing result can be achieved in a relatively short time. During the backwashing process, a valve 20a provided in the outlet tube 20 is adjusted so as to maintain a certain depth of water above the buoyant filter layer 16.

Preferably, a screen is provided in an upstream end of the water inlet tube 8 to remove relatively large solid substances from the water to be processed, and to thereby reduce the processing load on the water processing system. By thus reducing the processing load, it is possible to reduce the time required for processing a given amount of water, and to reduce the volume of the anaerobic chamber 4.

This water processing system was tested by using household sewage containing sewage from toilets, and the results of the test were generally favorable as summarized in Table 1.

TABLE 1

|  | BOD | SS | T-N |
| --- | --- | --- | --- |
| influx | 198 | 130 | 35 |
| effluent | 4.6 | 7 | 8.2 |

The resident time was four hours in the conducted test. If an attempt is made to reduce the BOD and T-N both below 10 mg/liter by using the standard activated sludge process, the necessary resident time may be as much as 15 hours, and it is additionally necessary to provide a sedimentation pond and a rapid filtering device. It was thus found that the water processing system according to the present invention has a far superior processing capability as compared to the conventional water processing system. Furthermore, the BOD was reduced below 10 mg/liter after approximately one hour of contact in the aerobic chamber 5, and more than 70% of $NH_4$-N was nitrified, whereby verifying that not only organic substance were efficiently decomposed by aerobic microbes but also the nitrifying microbes can be retained at a high concentration.

Embodiment 2

Figure 2:
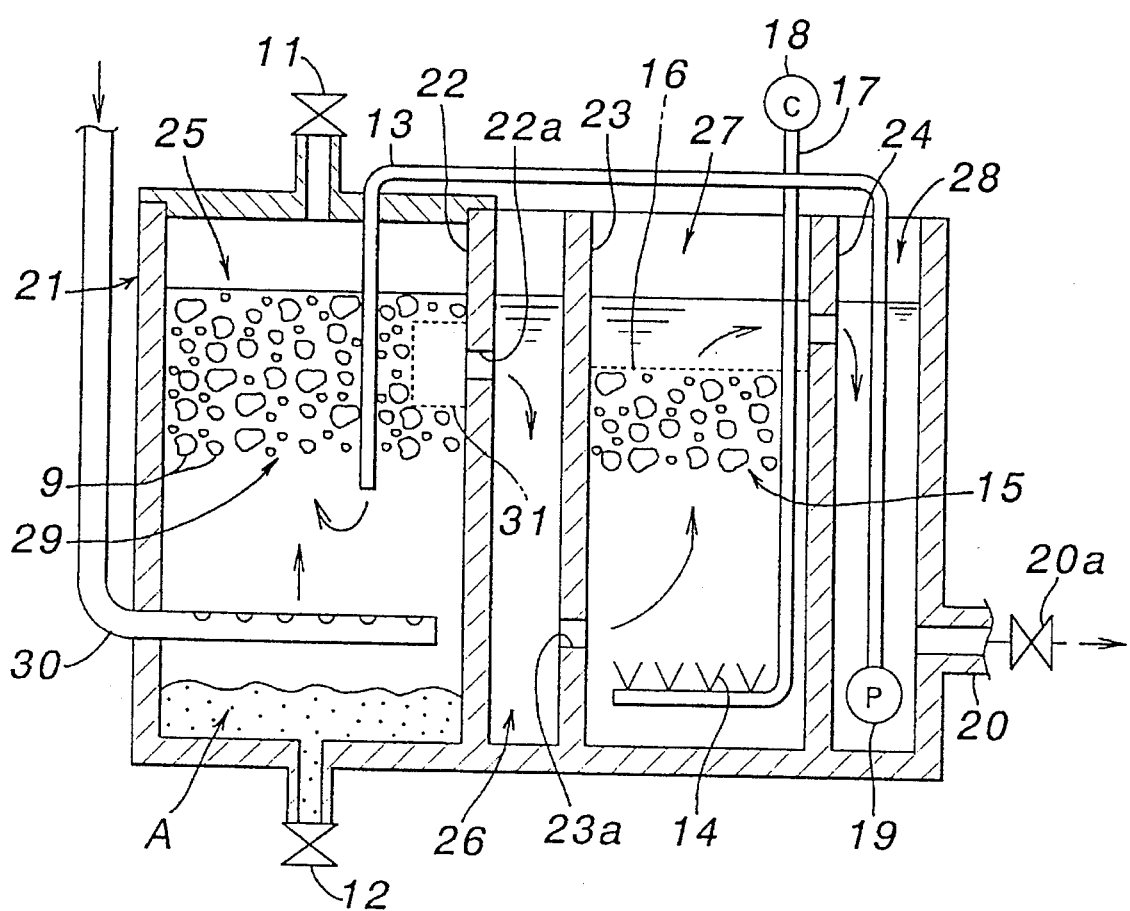
FIG. 2 is a diagram showing a second embodiment of the water processing system according to the present invention.

FIG. 2 shows a second embodiment of the water processing system for processing highly contaminated water according to the present invention. As opposed to the previous embodiment, this water processing system is designed to process water which has a high concentration of inorganic substances. The processing vessel 21 of this embodiment has an elongated rectangular shape, and is separated in four chambers by first to third partition walls 22, 23 and 24. The side wall and the bottom wall of the processing vessel 21 as well as the partition walls are integrally made of concrete. The four chambers consist of an anaerobic chamber 25, a flow direction reversing chamber 26, an aerobic chamber 27, and a buffering chamber 28, and the water to be processed is passed through these chambers in this order.

A buoyant filter layer 29 consisting of a large number of irregularly shaped filter material 9 is formed in the anaerobic chamber 25, and the water to be processed is introduced into the anaerobic chamber 25 from an inlet tube 30 connected to a relatively lower part of the anaerobic chamber 25. The filter material 9 in this case also consists of foamed plastic material. The water then flows upward through the buoyant filter layer 29, and passes into the flow direction reversing chamber 26 via a communication passage 22a provided in a relatively upper part of the first partition wall 22. The communication passage 22a is provided with a wire mesh screen 31 to prevent the filter material 9 from flowing into the flow direction reversing chamber 26.

The anaerobically processed water enters the flow direction reversing chamber 26 from a relatively upper part thereof, and leaves the same for the aerobic chamber 27 from a communication passage 23a provided in a relatively lower part of the flow direction reversing chamber 26. The aerobic chamber 27 is substantially identical to that of the previous embodiment, and is communicated with the buffering chamber 28 with a communication passage provided in a relatively upper part of the third partition wall 24. Thus, owing to the provision of the flow direction reversing chamber 26, the water to be processed flows upward in the aerobic chamber 27.

This water processing system was tested by processing sewage from a slaughter house, and the test results are summarized in Table 2.

TABLE 2

|  | BOD | SS | T-N |
| --- | --- | --- | --- |
| influx | 1,320 | 1,500 | 55 |
| effluent | 20 | 16 | 8.6 |

The sediment layer A for precipitating inorganic contents in this embodiment was provided immediately below the outlet end of the water inlet tube 30, but if the inorganic contents are not substantial, the outlet end of the inlet tube 30 may be provided along the bottom wall of the processing vessel 21. By doing so, the processing efficiency may be improved by producing a condition suitable for the biological process generally called as the UASB (upflow anaerobic sludge blanket) process.

Thus, the present invention can process highly contaminated water without involving premature clogging of the filter layers and, hence, the need for frequent backwashing. Furthermore, the water processing system of the present invention is highly simple in structure, and is suitable for compact design.

Although the present invention has been described in terms of preferred embodiments thereof, it is obvious to a person skilled in the art that various alterations and modifications are possible without departing from the scope of the present invention which is set forth in the appended claims.

What we claim is:

1. A water processing system for processing highly contaminated water, comprising:

a processing vessel having a plurality of processing chambers defined by partition walls;

said processing chamber comprising:

an anaerobic chamber having an inlet port and a buoyant filter layer consisting of a plurality of blocks of buoyant filter material which are unconstrained in a manner which allows said blocks of buoyant filter material to float to the level of the surface of the water in said anaerobic chamber;

an aerobic chamber having a first communication passage communicating a lower part thereof with said anaerobic chamber, a buoyant filter layer consisting of a plurality of blocks of buoyant filter material which are constrained in an intermediate part of said aerobic chamber by first screen means extending across said aerobic chamber, and aeration means, said communication passage being provided with second screen means for preventing said filter material in said anaerobic chamber from flowing into said aerobic chamber;

a buffering chamber having an outlet port and a second communication passage communicating an upper part of said aerobic chamber with said buffering chamber; and recycle means including a recycle passage communicating said buffering chamber with said anaerobic chamber, and pump means for supplying a part of water obtained from said aerobic chamber and stored in said buffering chamber to said anaerobic chamber.

2. A water processing system according to claim 1, wherein said inlet port is provided in an upper part of said anaerobic chamber, and said anaerobic chamber is directly communicated with said aerobic chamber via said first communication passage.

3. A water processing system according to claim 2, wherein said first communication passage consists of a plurality of small openings provided in a lower part of a partition wall separating said anaerobic chamber from said aerobic chamber.

4. A water processing system according to claim 3, wherein said part of said partition wall that is provided with said small openings is curved so as to allow a large number of small holes to be formed therein.

5. A water processing system according to claim 1, wherein said inlet port is provided in lower part of said anaerobic chamber, and said anaerobic chamber is communicated with said aerobic chamber via a flow direction reversing chamber communicating with said anaerobic chamber at an upper part thereof, and with said aerobic chamber at a lower part thereof.

6. A water processing system according to claim 5, wherein said second screen means is provided in a passage communicating said anaerobic chamber with said flow direction reversing chamber.

7. A water processing system according to claim 1, wherein said buffering chambers serves as a well for said recycle pump.

* * * * *

UNITED STATES PATENT AND TRADEMARK OFFICE
CERTIFICATE OF CORRECTION

PATENT NO. : 5,578,202
DATED : November 26, 1996
INVENTOR(S) : Ken Hirane

It is certified that error appears in the above-indentified patent and that said Letters Patent is hereby corrected as shown below:

On the Title page, item [75] delete "Saitama-ken, Japan" and insert--Tokyo, Japan--.

Signed and Sealed this

Eighteenth Day of March, 1997

Attest:

BRUCE LEHMAN

*Attesting Officer*  *Commissioner of Patents and Trademarks*